United States Patent [19]

Staar

[11] 3,864,743

[45] Feb. 4, 1975

[54] ARRANGEMENT FOR PLAYING RECORDING ON AN ENDLESS TAPE IN CARTRIDGES OF DIFFERENT TYPES

[76] Inventor: Marcel Jules Helene Staar, 479 avenue Louise, Brussels, Belgium

[22] Filed: Mar. 13, 1972

[21] Appl. No.: 234,250

Related U.S. Application Data

[63] Continuation of Ser. No. 823,883, May 12, 1969, abandoned.

[30] Foreign Application Priority Data

May 29, 1968 Belgium ............................ 715838

[52] U.S. Cl. ...................... 360/94, 360/96, 360/105

[51] Int. Cl. ........................................ G11b 23/04

[58] Field of Search .................... 274/4 R, 4 B, 4 G; 179/100.2 Z; 360/94, 96, 105

[56] References Cited

UNITED STATES PATENTS 3,524,651 8/1970 Ketzer ................................ 274/4 E 3,531,127 9/1970 Harper ................................ 274/4 G

*Primary Examiner*—Harry N. Haroian

*Attorney, Agent, or Firm*—Waters, Roditi, Schwartz & Nissen

[57] ABSTRACT

An arrangement for playing recordings on an endless magnetic tape in a cartridge comprising means for playing cartridges (22) of a different type having different physical, mechanical and electrical characteristics from the cartridges for which the playback device (1) is normally designed. The invention comprises an intermediary casing (21) having geometrical dimensions and properties substantially corresponding to those of the endless tape cartridge for which the playback device is normally designed, casing (21) bounding a space for holding a cartridge of a different type.

13 Claims, 12 Drawing Figures

ARRANGEMENT FOR PLAYING RECORDING ON AN ENDLESS TAPE IN CARTRIDGES OF DIFFERENT TYPES

This application is a continuation of Ser. No. 823,883, filed May 12, 1969, now abandoned.

It is known that cartridges are commercially available containing an endless magnetic tape bearing sound recordings and devices have been constructed which, when a cartridge is inserted, the tape is put to contact with the driving means, playback means and possibly also means for detecting the position of the tape, the last-mentioned means generally comprising a thin metal tab adhesively attached to the tape.

These cartridges will hereinafter be called "cartridges of the first type".

Other types of cartridges contain two small reels in which the magnetic tape unwinds from one on to the other, and vice versa.

It is obvious it would be desirable to have at disposal a device designed for cartridges of the first type which would be capable to play cartridges which will be called generally by "cartridges of a different type" or of the "second type".

According to the main feature of the invention, therefore, a device is provided for playing cartridges of a different type having different physical, mechanical and electrical properties from those of the first type for which the pick-up apparatus is normally designed, the apparatus according to the invention being designed so as to transform the physical, mechanical and electronic properties appropriate to a cartridge of the first type into properties suitable for playing back cartridges of the different type.

The invention will be clearly understood from the following non-limitative embodiments, with reference to the drawings in which.

Figure 1:
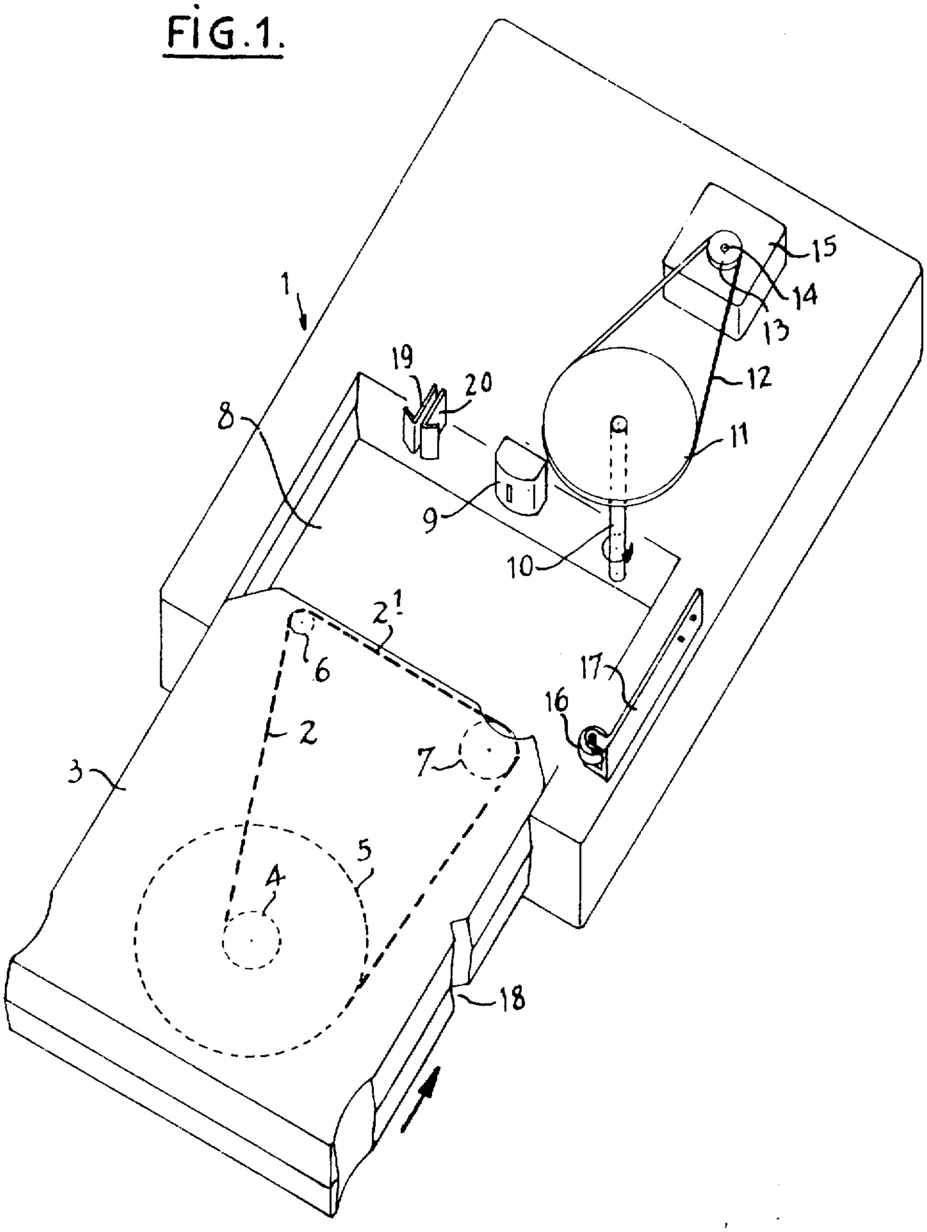
FIG. 1 shows a cartridge of the first type (an endless tape) and a known apparatus for unwinding the magnetic tape and reproducing the recordings. The figure shows how the elements in the apparatus and the cartridge are put into relation by inserting the cassette into the apparatus.

FIG. 1 shows a known small box-type apparatus 1 for playing back an endless magnetic tape 2 which unwinds in a cartridge 3 from a spindle 4 and is wound along its external diameter 5 and which is guided by rollers 6 and 7.

In the box 1 there is formed a space 8 into which a cartridge 3 is slid so as firstly enable tape 2 to be read and to be played back by a magnetic head 9 with which it makes contact by section 2¹ of tape 2; secondly to be driven by a capstan 10 which can grip tape 2 between itself and the roller 7. Capstan 10 is driven in rotation by a pulley of flywheel 11 and a belt 12 driven by a gearwheel 13 keyed on shaft 14 of a motor 15.

In the operative position the cartridge 3 is held by a roller 16 carried by a spring strip 17 secured to box 1 and adapted to engage a notch 18 on one edge of cartridge 3.

The playback apparatus, which comprises the means for driving tape 2 and the playback means, can also be used to contact a tape position detecting element, generally comprising a thin metal tab (not shown) which is glued to certain parts of the tape and can co-operate with strips 19–20 (FIG. 1).

FIG. 1 thus shows a cartridge 3 with an endless tape and the device for unwinding the magnetic tape and playing it back. It also shows how by inserting the cassette into the apparatus the elements in the apparatus and in cartridge 3 are put into relation with one another.

Figure 2:
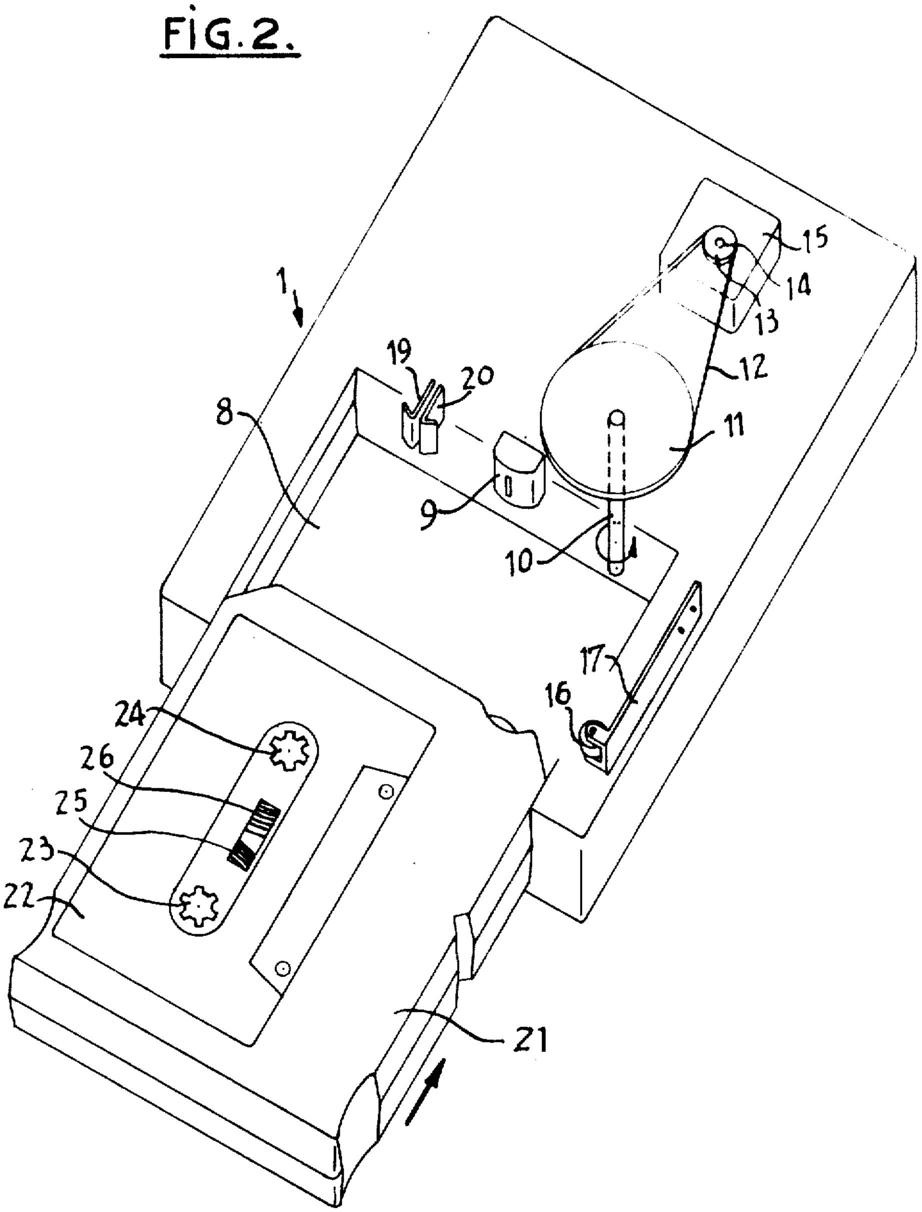
FIG. 2 shows how according to the invention a cartridge of a different type can be inserted into the same apparatus.

The invention provides a device which comprises an intermediary casing 21 (FIG. 2) which has substantially the same geometrical dimensions and properties as cartridge 3 of FIG. 1 and is formed with a space for holding a cartridge 22 of a different type having in the example shown two small reels the driving axles of which are represented in 23–24 and which contains a magnetic tape which unwinds form one spool and winds on the other and vice versa; the wound parts are denoted by 25 and 26.

According to the invention means are provided in order to adapt one cartridge to the characteristics of cartridge "of the different type".

In a first embodiment (FIGS. 3 and 4) the device for rendering possible this adaptation or accomodation comprises a lever 27 which can pivot round a spindle 28 which has a projection 29 having a slope 30 and which is acted upon by a spring 31. The pivoting of lever 27 is limited by a stop 32.

Lever 27 is disposed so that, when in the operating position, one edge 27¹ (FIG. 3) extends alongside cartridge 22. On this edge a reading head 33 is provided approximately substantially in its middle, for reading signals recorded on the magnetic tape 34 of cartridge 22.

Figure 4:
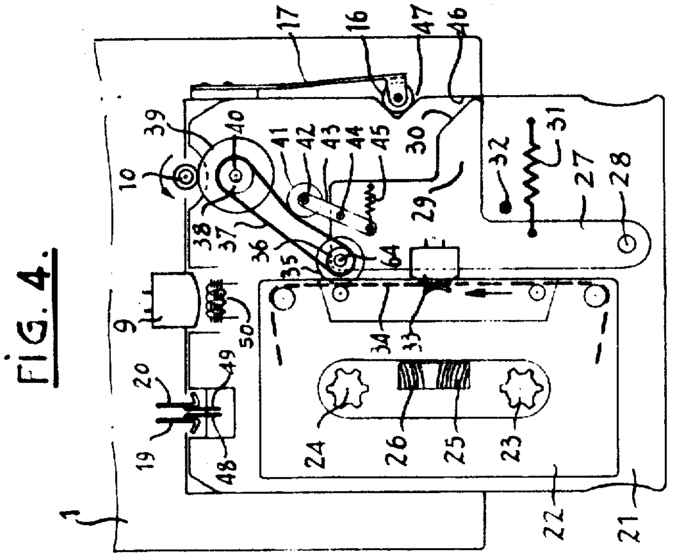
FIGS. 3 and 4 show a first embodiment of the apparatus.

Lever 27 also bears a spindle 64 near its top, on which a double pulley can rotate, comprising a driving roller 35 for magnetic tape 34 and a grooved pulley 36 caused to rotate by a belt 37 actuated by another two-stage pulley 38–39 which can rotate on a spindle 40 and is driven by capstan 10 when the intermediary casing 21 has been pushed into the operative position (FIG. 4).

Belt 37 is submitted to the action of a pulley 41 rotating on a spindle 42 actuated to one end of a lever 43 which can pivot on a spindle 44 borne by lever 27 and acted upon by a spring 45.

At the end of the sliding movement of the casing 21 when pulley 39 has made contact with capstan 10, slope 30 of lever projection 29 meets at 46 (FIG. 4) the inner surface of space 8 so that lever 27 pivots and reading head 33 makes contact with tape 34 (FIG. 4), which is driven by capstan 10 via pulleys 39 and 38, belt 37, pulley 36 and driving roller 35 which has made contact with tape 34.

Casing 21 is kept in the operative position by roller 16 which penetrates into a notch 47 in the casing.

Moreover due to the sliding of the casing 21 and the end of this sliding, the strips 48–49 likewise make contact with a source of current 19–20; an induction coil 50 is moved in front of magnetic head 9.

Belt 37 is constructed so as to transmit the movement of capstan 10 to roller 35 with minimum sliding and whipping. To this end, the material from which it is made is chosen so that it stretches as little as possible. The material can, for example be of the kind called "Mylar" and produced by the Du Pont de Nemours Company.

Figure 12:
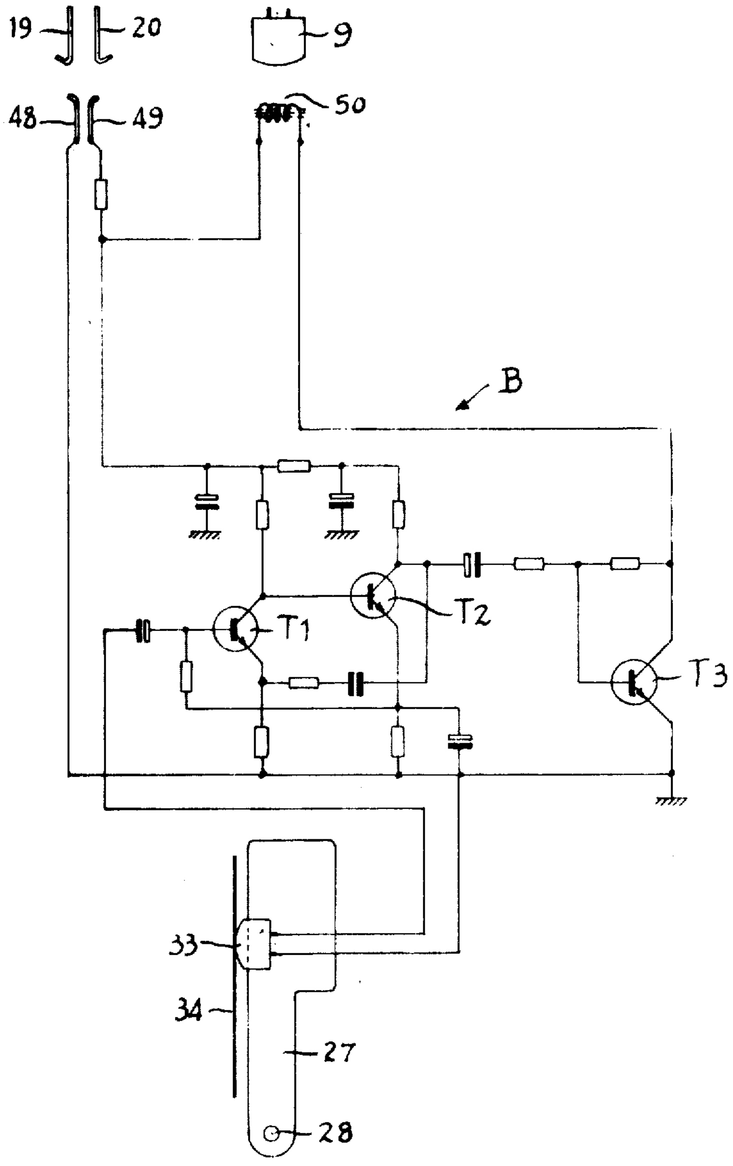
FIG. 12 is a diagram of the electronic device used for accomodation.

As shown by the diagram in FIG. 12, signals picked up on magnetic tape 34 of cartridge 22 by reading head 33 are received and processed by an electronic sub-unit B and are transmitted to coil 50, and then transmitted by induction to head 9 of the pick-up apparatus.

The currents collected by head 33 are amplified by transistors T1, T2 and T3 which energise coil 50 and the latter transmits the resulting modulations by induction into head 9. The whole unit is powered by contacts 48 and 49.

Sub-unit B and head 33 are energised by elements 19–48 and 20–49 (FIG. 12).

Figure 3:
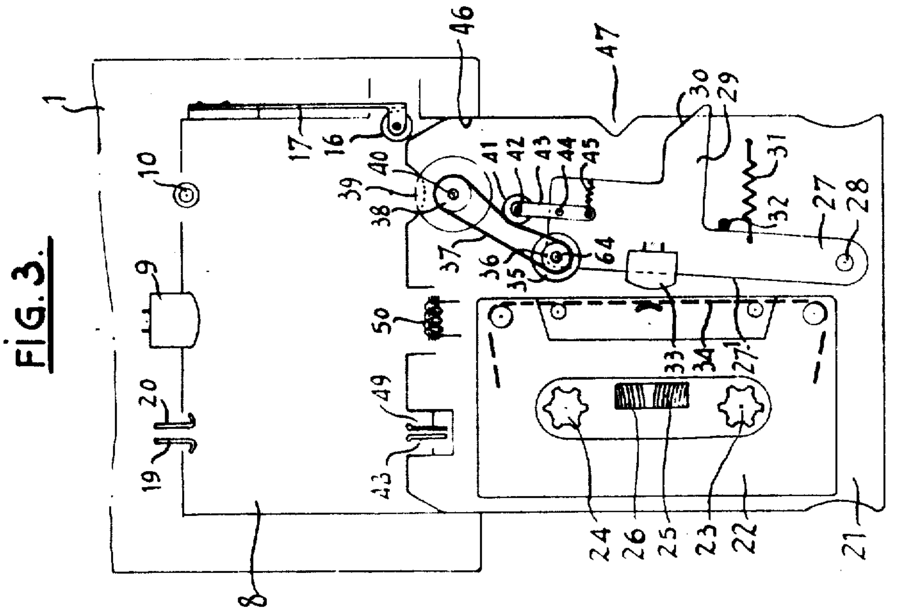

The playback can be stopped merely by withdrawing casing 21 and its cartridge 22 from space 8 and moving them to the position shown in FIG. 3.

Another cartridge can be placed in box 21 and then moved to the playback position.

Figure 6:
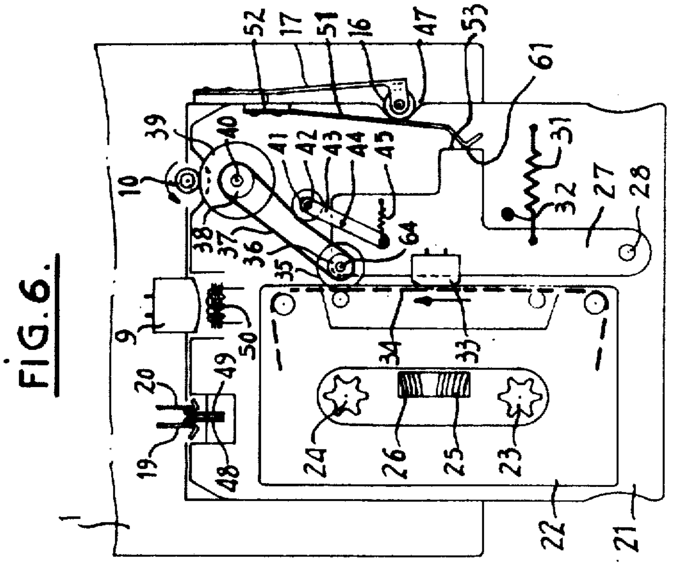
FIGS. 5 and 6 show a second embodiment of the apparatus.
Figure 5:
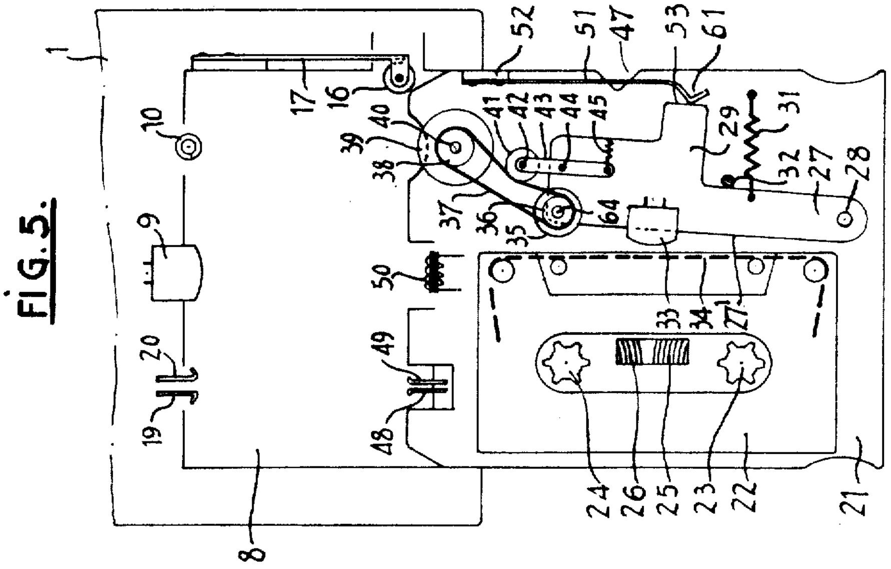

FIGS. 5 and 6 show another embodiment in which the projection 29 of lever 27 does not comprise a slope and is acted upon by a leaf spring 51 secured to casing 21 at 52 and acting on the straight end 53 of projection 29 by means of a spur or hook 61.

Figure 8:
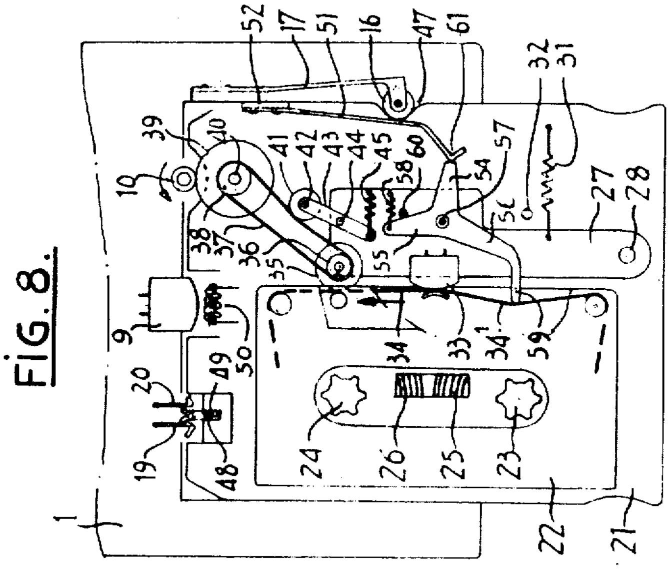
FIGS. 7 to 11 show an embodiment comprising means for automatically stopping the playback.
Figure 7:
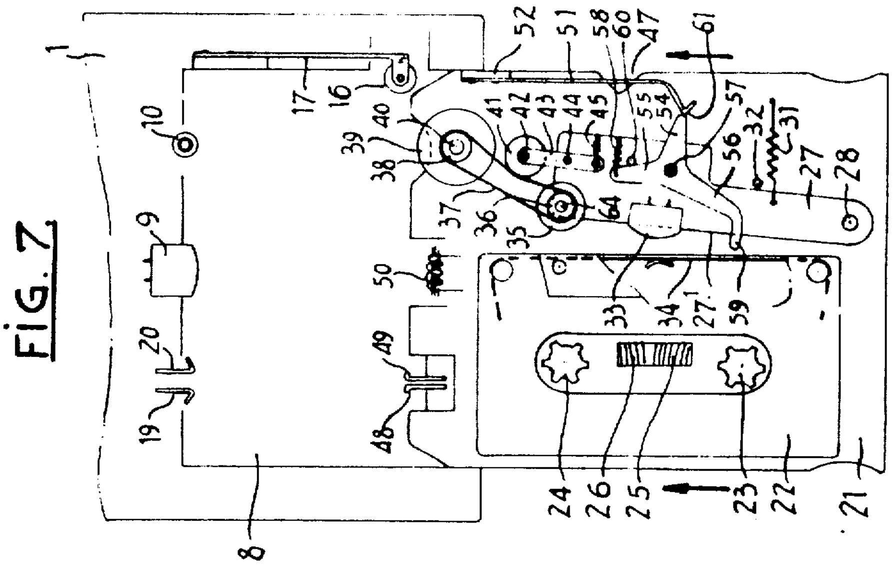
Figure 11:
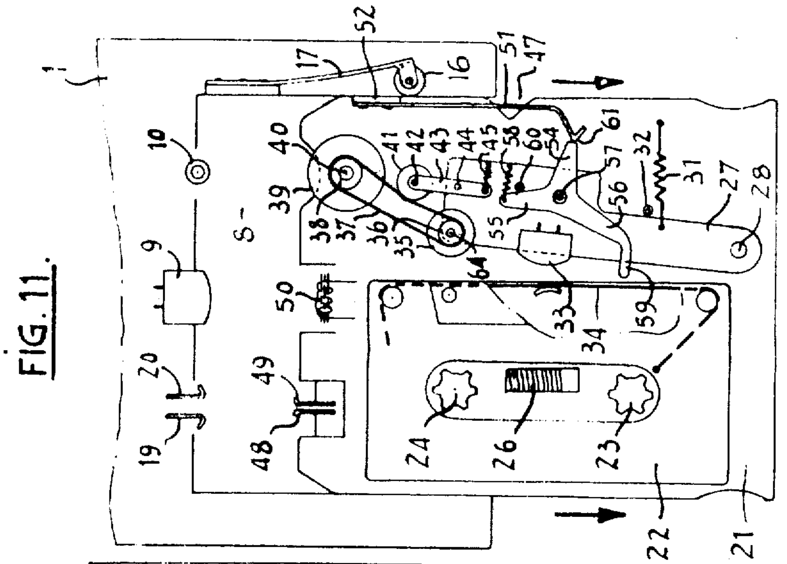

In FIGS. 7 and 8, an automatic stopping device for the tape comprises a lever having three arms 54–55 and 56 which can rotate round a spindle 57 integral with lever 27.

The end of one arm 54 may be acted upon at its end by a hook 61 of leaf spring 51, which can be submitted to the action of a locking roller 16 when the latter is in notch 47 and the device is in the operative position; arm 55 is acted upon by a helical spring 58 and arm 56 has an extension 59 for cooperating with tape 34.

During the playback, tape 34 is slightly stretched and bent as shown at 34[1] (FIG. 8).

Figure 9:
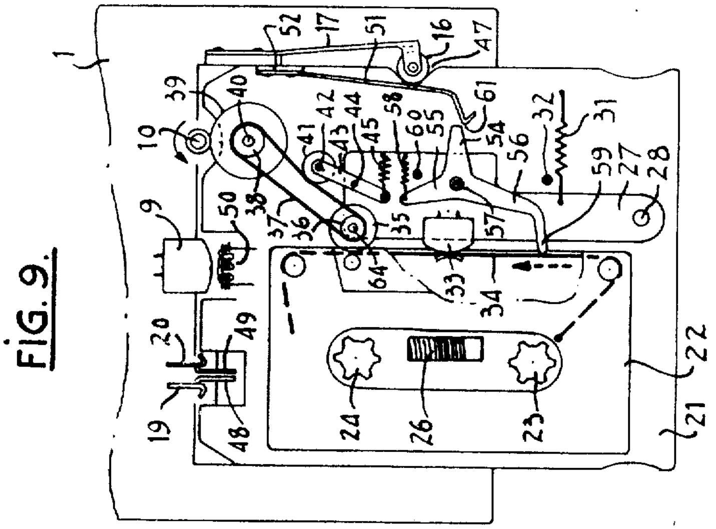

At the end of unwinding, tape 34 is submitted to increased tension between driving roller 35 which is still driving it, and the spool to which it is attached, and finally ceases to move. As a result, the extension 59 of lever 56 is retracted and the unit 54–55–56 pivots into the position shown in FIG. 9 and is no longer acted upon by spring 51 which was holding lever 27 by arm 54 in the position shown in FIG. 8.

Figure 10:
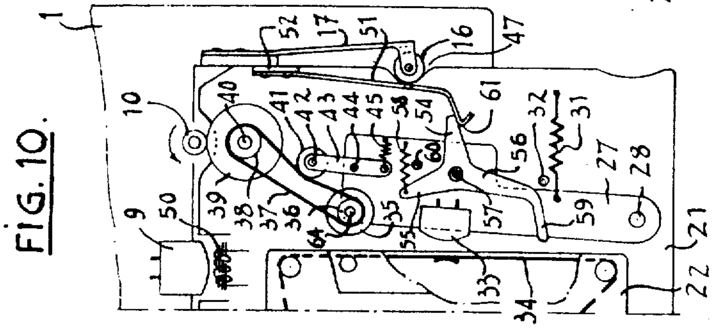

Under the action of spring 31, lever 27 pivots round 28 into the position in FIG. 10 where tape 34 is released from the action of roller 35, which however can continue to revolve.

Next, when box 21 holding cartridge 22 is withdrawn, pulley 39 loses contact with capstan 10 and the device for accomodating or adapting one cartridge to the characteristics of the other is completely stopped whilst roller 16 comes out of notch 47. The pressure exerted by roller 16 on leaf spring 51 stops, so that lever 54–55–56 is pivoted clockwise by spring 58 until its arm 55 makes contact with a stop 60 whilst the end of arm 54 comes below hook 61 of spring 51.

The following points should be specially noted:

a. The elements of the playback device whose characteristics have to be adapted or accomodated are not put in the operative position until the device for accomodating has been inserted and put into position.

When the "adaptor" (device for accomodating) is not in position, space 22 for holding a cassette of a different type is free from all obstacles.

b. The device for driving the tape contained in casing 21 is specially designed to take account of the dimensions necessary for the casing and to make a connection between capstan 10 and driving wheel 35 without being dependent upon the position of the flywheel or of pulley 11.

c. The current required for operating the electronic sub-unit is taken from strips 19–20 which form part of existing pick-up devices in the known device but exerting other functions.

d. When the cartridge of the different type with respect to which the accomodation must take place is being played back, the signals from tape 34 of the cartridge are picked up by head 33, are amplified and transmitted by induction to magnetic head 9 which transmits them to the amplifying and playback means of the main apparatus 1.

What I claim is:

1. In a box-type tape record player for playing an endless-magnetic tape cartridge, an aperture in said player adapted to slidingly receive said cartridge, said player comprising tape driving means and playback means including a first playback head for the magnetic tape contained in said cartridge; an improvement comprising said aperture in said player being adapted to slidingly receive upon withdrawal of said cartridge, a converter having exterior geometrical dimensions and operative characteristics substantially corresponding to those of said endless-magnetic tape cartridge; said converter including an aperture dimensioned to receive and position a magnetic-tape-containing cartridge of generally smaller exterior dimensions than said first-mentioned cartridge; a second playback head in said converter for reading the magnetic tape of the smaller-dimensioned cartridge positioned therein; means in said converter for driving said last-mentioned magnetic tape, said tape driving means being connectable with the driving means of the player, said smaller dimensioned cartridge including a pair of rotatable spools, a magnetic tape containing said recordings being wound about said spools and extending therebetween, said tape being adapted to be wound and unwound respectively, from one spool to the other, said playback means comprising a capstan in said player rotatably driven by a motor positioned in said player along said aperture edge, drive roller means in said converter for imparting rotation to said spools, a longitudinally inextensible flexible belt in said converter drivingly interconnecting said roller means and said capstan for moving said tape along said second playback head, a pivotable lever on said converter, said lever having a rectilinear edge which in the operative position of said converter extends in proximity to said further cartridge, said second playback head and said drive roller means being mounted on said lever; and spring means urging said lever out of contact with the tape, said lever including a projection, a slope on said projection, said projection being adapted to make contact with the internal surface of the aperture formed in the player so as to cause said lever to pivot and the second head and roller means contact with the tape in said smaller-dimensioned cartridge upon insertion of the converter in said player.

2. An improvement as claimed in claim 1, wherein said drive roller means comprises a pair of spaced pulleys, said belt interconnecting and rotating said pulleys, said capstan being adapted to drive said belt upon said converter and being operatively positioned within said player aperture.

3. An improvement as claimed in claim 1, comprising lever means on said lever for automatically stopping movement of the tape of said further cartridge at the end of playback thereof, said lever means including three arms and being coaxially pivotable with said converter lever, a leaf spring acting on a first one of said arms, and a strip spring-mounted roller on said player adapted to engage a recess in said converter upon insertion of the latter into said player aperture, said roller cooperatingly engaging said leaf spring for actuation thereof.

4. An improvement as claimed in claim 3, comprising a helical spring acting on a second of said arms, said third arm having an extension adapted to cooperatively engage the magnetic tape of said further cartridge at the end of playback, said three-armed lever means being adapted to pivot so as to disengage from said strip spring-mounted roller, said roller correspondingly releasing said converter lever so as to pivot the latter and release said tape from driving thereof.

5. An improvement as claimed in claim 1, said means for moving the tape along said second playback head comprising a tape driving roller.

6. An improvement as claimed in claim 1, said belt being formed of synthetic plastic material.

7. In a box-type tape record player for playing an endless-magnetic tape cartridge, an aperture in said player adapted to slidingly receive said cartridge, said player comprising tape driving means and playback means including a first playback head for the magnetic tape contained in said cartridge; an improvement comprising said aperture in said player being adapted to slidingly receive upon withdrawal of said cartridge, a converter having exterior geometrical dimensions and operative characteristics substantially corresponding to those of said endless-magnetic tape cartridge; said converter including an aperture dimensioned to receive and position a magnetic-tape-containing cartridge of generally smaller exterior dimensions than said first-mentioned cartridge; a second playback head in said converter for reading the magnetic tape of the smaller-dimensioned cartridge positioned therein; means in said converter for driving said last-mentioned magnetic tape, said tape driving means being connectable with the driving means of the player, said smaller dimensioned cartridge including a pair of rotatable spools, a magnetic tape containing said recordings being wound about said spools and extending therebetween, said tape being adapted to be wound and unwound respectively, from one spool to the other, said playback means comprising a capstan in said player rotatably driven by a motor positioned in said player along said aperture edge, drive roller means in said converter for imparting rotation to said spools, a longitudinally inextensible flexible belt in said converter drivingly interconnecting said roller means and said capstan for moving said tape along said second playback head, a pivotable lever on said converter, said lever having a rectilinear edge which in the operative position of said converter extends in proximity to said further cartridge, said second playback head and said drive roller means being mounted on said lever, and spring means urging said lever out of contact with the tape, said lever including a projection extending into proximity with the internal surface of the aperture formed in the player; a leaf spring fastened to said converter contacting said projection; and a strip spring-mounted roller on said player adapted to engage a recess in said converter upon insertion of the latter into said player aperture, said roller engaging said leaf spring for actuation thereof.

8. In a box-type tape record player for playing an endless-magnetic tape cartridge, an aperture in said player adapted to receive said cartridge, said cartridge including means for moving said endless tape along one edge thereof in proximity to said aperture, and playback means in said player adjacent said aperture edge for playing back recordings on said tape, the improvement comprising; said aperture being adapted to receive, upon withdrawal of said cartridge, a converter cassette having exterior dimensions corresponding essentially to said cartridge, an aperture in said converter cassette, a further cartridge of generally smaller dimensions and characteristic than said first-mentioned cartridge being positioned in said converter cassette aperture, means in said converter cassette cooperative with said playback means in said player for providing playback of recordings in said last-mentioned cartridge, said last-mentioned cartridge comprising a pair of rotatable spools, a magnetic tape containing said recordings being wound about said spools and extending therebetween, said tape being adapted to be wound and unwound respectively, from one spool to the other, said playback means comprising a first playback head for contact by the endless tape of said first-mentioned cartridge, a capstan rotatably driven by a motor positioned in said player along said aperture edge, a second playback head in said converter cassette for reading the spool-wound tape on said further cartridge, drive roller means in said converter cassette for imparting rotation to said spools, means in said converter cassette drivingly interconnecting said roller means and said capstan so as to move said tape along said second playback head, a pivotable lever on said converter cassette, said lever having a rectilinear edge which in the operative position of said converter cassette extends in proximity to said further cartridge, said second playback head and said drive roller means being mounted on said lever, lever means for automatically stopping movement of the tape of said further cartridge at the end of playback thereof, said lever means including three arms and being coaxially pivotable with said converter cassette lever, a leaf spring acting on a first one of said arms, and a strip spring-mounted roller on said player adapted to engage a recess in said converter cassette upon insertion of the latter into said player aperture, said roller cooperatingly engaging said leaf spring for actuation thereof.

9. An improvement as claimed in claim 8, comprising a helical spring acting on a second of said arms, said third arm having an extension adapted to cooperatively engage the magnetic tape of said further cartridge at the end of playback, said three-armed lever means being adapted to pivot so as to disengage from said strip spring-mounted roller, said roller correspondingly releasing said converter cassette lever so as to pivot the latter and release said tape from driving thereof.

10. An improvement as claimed in claim 8, wherein said drive roller means comprises a pair of spaced pulleys, a belt interconnecting and rotating said pulleys, said capstan being adapted to drive said belt upon said converter cassette being operatively positioned in said player aperture.

11. An improvement as claimed in claim 8, comprising resilient spring means adapted to bias said lever into an operative position with said tape.

12. An improvement as claimed in claim 8, wherein said lever includes a sloped projection, said projection being adapted to contact the edge of the aperture of said player upon insertion of said converter cassette and effect pivoting of said lever, said pivoting motion causing contact between the second playback head and drive roller means and said tape in said further cartridge.

13. An improvement as claimed in claim 8, wherein said lever includes a rectilinear projection, and leaf spring means being fastened to said converter cassette for imparting a biasing force to said projection so as to pivot said lever.

* * * * *